(12) United States Patent
Fenton et al.

(10) Patent No.: US 9,610,861 B2
(45) Date of Patent: Apr. 4, 2017

(54) TRACK AND SEAT ADAPTER FOR POSITIONING AND LOCKING WHEELCHAIRS AND TRANSIT SEATS

(71) Applicant: Fenton Mobility Products Inc., Jamestown, NY (US)

(72) Inventors: Scott Ivan Fenton, Sinclairville, NY (US); Gerald James Hildom, Jamestown, NY (US)

(73) Assignee: Fenton Mobility Products Inc., Jamestown, NY (US)

( * ) Notice: Subject to any disclaimer, the term of this patent is extended or adjusted under 35 U.S.C. 154(b) by 0 days.

(21) Appl. No.: 15/065,336

(22) Filed: Mar. 9, 2016

(65) Prior Publication Data

US 2016/0185257 A1  Jun. 30, 2016

Related U.S. Application Data

(62) Division of application No. 13/919,684, filed on Jun. 17, 2013, now abandoned.

(51) Int. Cl.
| | | |
|---|---|---|
| *B60P 7/08* | (2006.01) | |
| *B60N 2/015* | (2006.01) | |
| *A61G 3/08* | (2006.01) | |

(52) U.S. Cl.
CPC ......... *B60N 2/0155* (2013.01); *A61G 3/0808* (2013.01); *B60N 2/01508* (2013.01); *B60N 2/01558* (2013.01); *B60N 2/01591* (2013.01); *B60P 7/0815* (2013.01)

(58) Field of Classification Search
CPC .............................. B60P 7/0815; B65D 45/001
USPC ........................................... 410/104, 105, 8
See application file for complete search history.

(56) References Cited

U.S. PATENT DOCUMENTS

| | | |
|---|---|---|
| 3,713,616 A | 1/1973 | Bowers |
| 3,806,191 A | 4/1974 | Stegmaier |
| 4,189,957 A | 2/1980 | Gedig et al. |
| 4,771,969 A | 9/1988 | Dowd |

(Continued)

FOREIGN PATENT DOCUMENTS

| | | | |
|---|---|---|---|
| CA | 2889621 A1 * | 12/2015 | ............ B60P 7/0815 |
| DE | 3623007 A1 | 1/1988 | |

(Continued)

OTHER PUBLICATIONS http://www.minibusoptions.co.uk/conversion/flooring (last visited Jul. 9, 2013 12:01PM).

(Continued)

*Primary Examiner* — H Gutman
(74) *Attorney, Agent, or Firm* — Simpson & Simpson, PLLC

(57) ABSTRACT

A track assembly for positioning and removably securing wheelchairs and transit seats in a vehicle, having a first rail having a frame, the frame having a top surface, a first side surface, a second side surface, and a longitudinal axis. The track assembly further includes a plurality of apertures having a shape, the apertures evenly distributed within the top surface along the longitudinal axis of the frame, a plurality of channels connecting the first and second side surfaces proximate the top surface, the channels evenly distributed along the longitudinal axis of the frame, and a second rail identical to and arranged in parallel with the first rail to form the track assembly.

11 Claims, 15 Drawing Sheets

(56) References Cited

U.S. PATENT DOCUMENTS

| | | | |
|---|---|---|---|
| 4,776,533 A | 10/1988 | Sheek et al. | |
| 5,083,726 A | 1/1992 | Schurr | |
| 5,106,144 A | 4/1992 | Hayakawa et al. | |
| 5,156,438 A | 10/1992 | Hayakawa et al. | |
| 5,158,338 A | 10/1992 | Hayakawa et al. | |
| 5,391,030 A | 2/1995 | Lee | |
| 5,533,848 A * | 7/1996 | Davis | B60P 7/0815 410/104 |
| 5,564,315 A | 10/1996 | Schuler et al. | |
| 5,769,360 A | 6/1998 | Kerbis et al. | |
| 5,782,138 A | 7/1998 | Groche | |
| 5,913,947 A | 6/1999 | Groche | |
| 5,921,606 A | 7/1999 | Moradell et al. | |
| 6,260,813 B1 | 7/2001 | Whitcomb | |
| 6,322,036 B1 | 11/2001 | Tame et al. | |
| 6,361,098 B1 | 3/2002 | Pesta et al. | |
| 6,406,230 B1 | 6/2002 | Mason et al. | |
| 6,772,985 B2 | 8/2004 | Lee | |
| 6,851,523 B1 | 2/2005 | Gaster | |
| 6,869,260 B1 | 3/2005 | Mason | |
| 6,892,995 B2 | 5/2005 | Tame et al. | |
| 6,959,900 B2 | 11/2005 | Hoshihara et al. | |
| 7,370,832 B2 | 5/2008 | Frantz et al. | |
| 7,413,143 B2 | 8/2008 | Frantz et al. | |
| 7,413,390 B1 * | 8/2008 | Allison, Jr. | B60P 7/0807 410/102 |
| 7,506,856 B2 | 3/2009 | Ikegaya et al. | |
| 7,607,613 B2 | 10/2009 | Frantz et al. | |
| 7,665,939 B1 | 2/2010 | Cardona | |
| 7,717,655 B2 | 5/2010 | Cardona | |
| 7,837,145 B2 | 11/2010 | Wodak | |
| 7,850,137 B2 | 12/2010 | Abdella et al. | |
| 7,975,979 B2 | 7/2011 | Bishop | |
| 8,074,954 B2 | 12/2011 | Wilhelm et al. | |
| 8,371,550 B2 | 2/2013 | Horst et al. | |
| 8,371,781 B2 | 2/2013 | Roy et al. | |
| 8,678,336 B2 | 3/2014 | Couasnon et al. | |
| 8,702,053 B2 | 4/2014 | Line et al. | |
| 2002/0119023 A1 * | 8/2002 | Delay | B62D 25/2054 410/121 |
| 2004/0028497 A1 * | 2/2004 | Wheatley | B61D 45/001 410/115 |
| 2007/0063122 A1 | 3/2007 | Bowd et al. | |
| 2009/0035088 A1 | 2/2009 | Powers et al. | |
| 2009/0236488 A1 | 9/2009 | Koga et al. | |
| 2012/0181409 A1 * | 7/2012 | Hayahara | B60N 2/01575 248/429 |
| 2012/0217368 A1 | 8/2012 | Zunino et al. | |
| 2014/0374564 A1 * | 12/2014 | Schroeder | B60P 7/0815 248/503 |

FOREIGN PATENT DOCUMENTS

| | | | |
|---|---|---|---|
| DE | WO 2004052681 A1 * | 6/2004 | B60P 7/0815 |
| DE | 102009021777 A1 | 11/2010 | |
| EP | 1688298 A1 | 8/2006 | |
| FR | 2110852 A5 * | 6/1972 | B60P 7/0815 |
| GB | 2286522 A | 8/1995 | |
| JP | 01060445 | 7/1989 | |
| JP | WO 2011021514 A1 * | 2/2011 | B60N 2/01575 |
| WO | 2007060488 A2 | 5/2007 | |

OTHER PUBLICATIONS http://www.euromotive.co.uk (last visited Jul. 9, 2013 12:04PM).
http://fordbus.co.uk (last visited Jul. 8, 2013 4:30PM).
http://www.cotrim.co.uk (last visited Jul. 9, 2013 11:49AM).
http://amf-bruns-behindertenfahrzeuge.de (last visited Jul. 9, 2013 12:00PM).
http://www.qstraint.com/images/stories/pdf/Q5-1150.pdf (last visited Jul. 9, 2013 11:57AM).
http://www.mobilityworks.com (last visited Jul. 9, 2013 12:44PM).
http://www.freedmanseating.com/seats_and_accessories/passenger_seats/3_point_seat/ (last visited Jul. 10, 2013 10:35AM).
http://www.cargoequipmentcorp/A-Track-Logistics-p/2025-5.htm (last visited Jul. 10, 2013 10:38AM).
http://www.sure-lok.com/products/floor-anchor-systems/series-a-track.html (last visited Jul. 10, 2013 10:40AM).

* cited by examiner

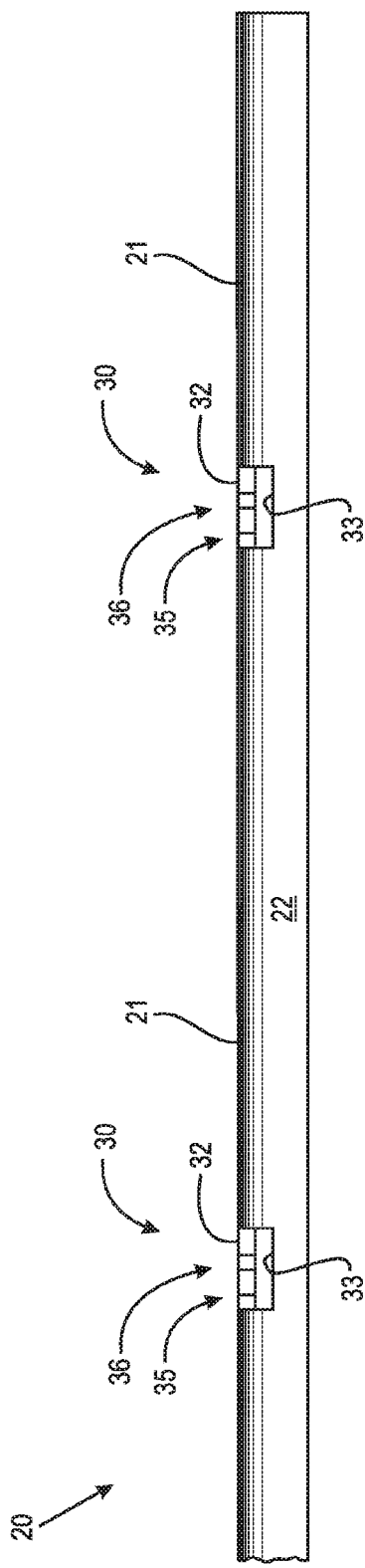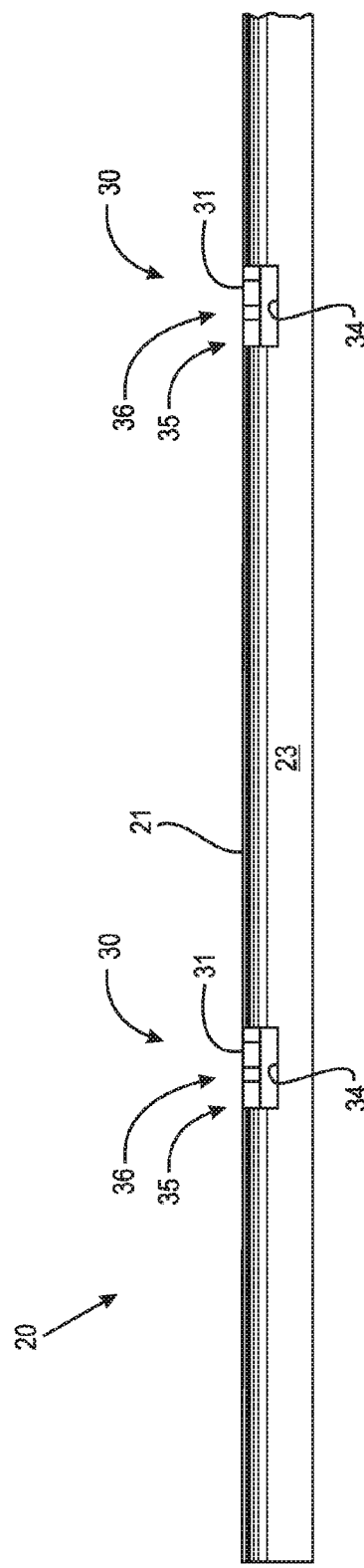

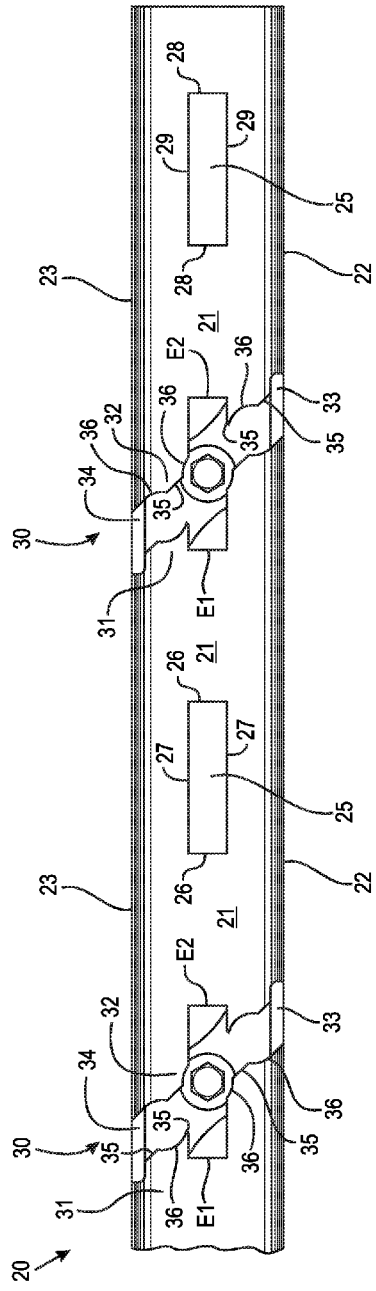
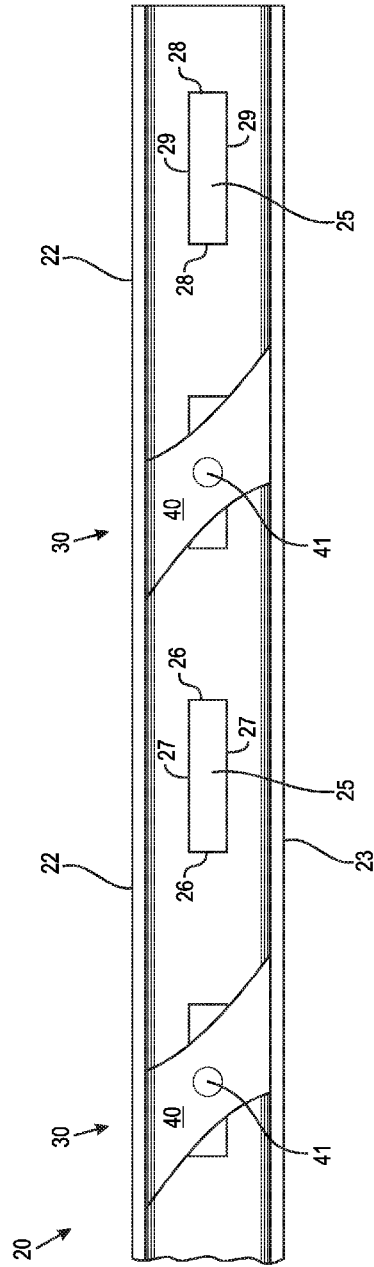

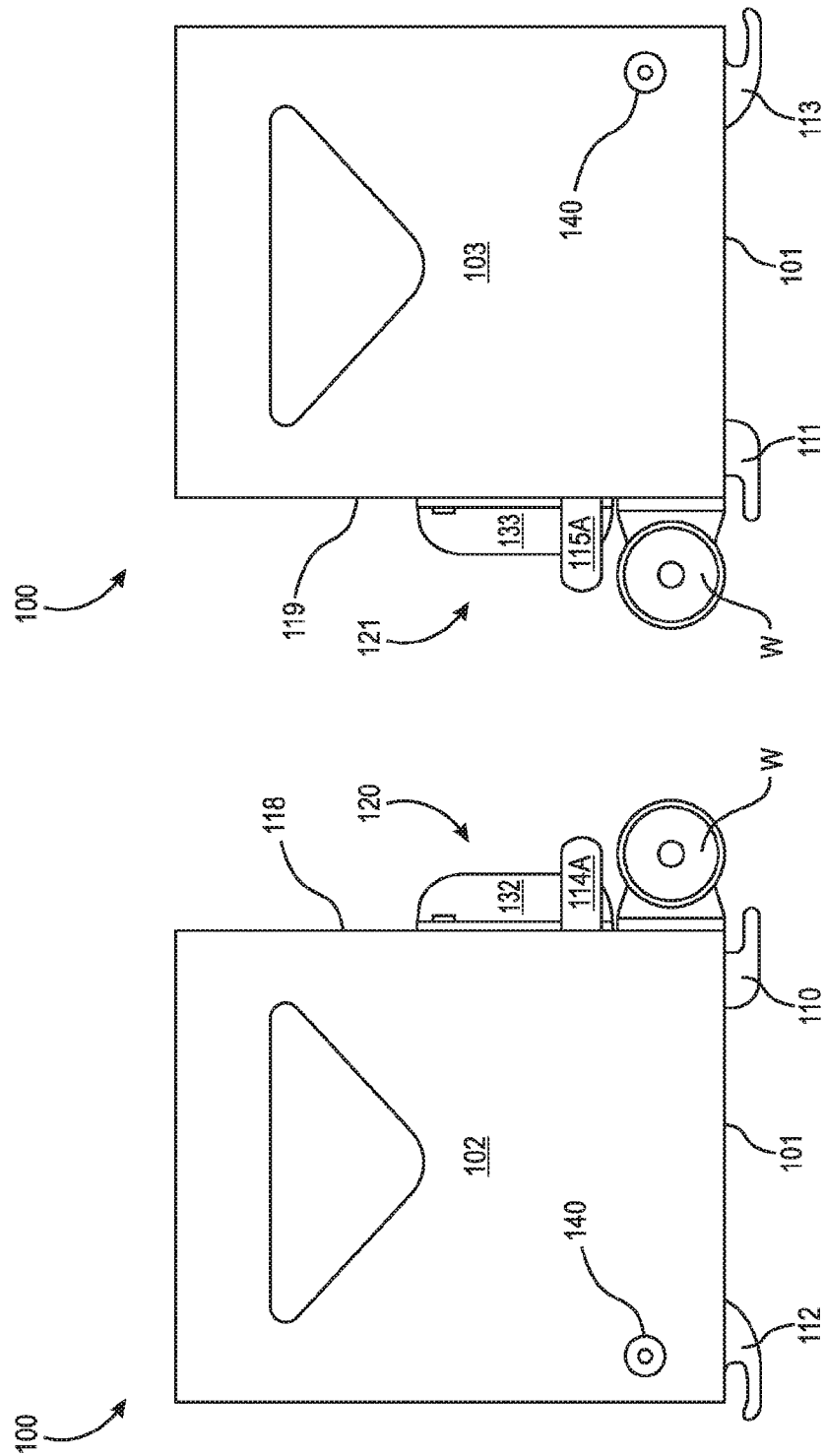

TRACK AND SEAT ADAPTER FOR
POSITIONING AND LOCKING
WHEELCHAIRS AND TRANSIT SEATS

CROSS-REFERENCE TO RELATED
APPLICATIONS

This application is a divisional patent application filed under 35 USC §§120 and 121 based on application Ser. No. 13/919,684, filed on Jun. 17, 2013, which application is incorporated by reference to its entirety.

FIELD OF THE INVENTION

The present invention relates generally to a secure means for locking cargo and seating in a transportation means. More specifically, the present invention relates to floor-mounted tracks and seat adapters for positioning and locking cargo, wheelchairs, and transit seats within a transportation means such as cars, taxis, buses, vans, and airplanes.

BACKGROUND OF THE INVENTION

Cars, trucks, vans, airplanes, para-transit vehicles, buses, taxicabs, mobility cars, accessible sport-utility vehicles (SUV), and the like, have been adapted to include track systems that accommodate various types of equipment, cargo, and seating arrangements. Seating arrangements include standard one, two, or three passenger seating, transit seating, and wheelchair accessible seating. Track systems include horizontal A-tracks, vertical A-tracks, horizontal E-tracks, vertical E-tracks, F-tracks, and L-tracks. These tracks can be made of a variety of materials including iron and steel and can be all different lengths and widths. The track types (A, E, F, and L) are differently shaped and/or arranged to accommodate different fittings. A-tracks are traditionally used for cargo. L-tracks are traditionally used for tie downs and accessories such as oxygen tanks. Some seat adapters operate with L-tracks. The desired track system depends on the type of seating or equipment to be secured and the restraining mechanisms to be used with the seating or equipment.

The differences between the types of tracks can be subtle or blatant. Vertical A-tracks contain elongated rectangular apertures that are evenly distributed along the longitudinal axis of the track; each aperture is parallel to the sides of the track. Horizontal A-tracks contain elongated rectangular apertures that are also evenly dispersed along the longitudinal axis of the track; each aperture is arranged transversely to the sides of the track. E-tracks also contain generally elongated rectangular apertures disposed within the track, but E-tracks differ from A-tracks in cross section. In cross section, A-track apertures are in line with the track, whereas E-track apertures contain protrusions. F-tracks contain circular apertures in the track. The apertures in F-tracks, like the apertures in A-tracks, are in-line with the track. L-tracks contain a channel along the longitudinal axis of the track, a slot formed through the upper surface of the track in communication with the channel, and cylindrical apertures superimposed above the slot in the top surface of the track. In cross section, L-tracks are generally C-shaped. U.S. Pat. No. 7,975,979 (Bishop) discloses an L-track of this type. Similarly, U.S. Pat. No. 4,771,969 (Dowd) and U.S. Pat. No. 5,083,726 (Schurr) describe L-tracks.

Such track systems can be installed in the floor or along the walls of an array of vehicles to removably attach and secure cargo, standard passenger seats, transit seats, and/or wheelchairs. These track systems enable a vehicle owner and/or operator to set and vary the seating configuration of a vehicle cabin. However, a vehicle owner is limited, by the particular track system they have installed, to those products that correspond with the track system installed. Alternatively, a vehicle owner can remove their current track system and install a completely new and different track system to accommodate other products. Installing, arranging, and rearranging such seating arrangements can be wasteful, time consuming, expensive, bulky and/or cumbersome.

Transit seats and wheelchairs are adapted to releasably lock with the tracks described above using various secure means. One such attempt is described in U.S. Pat. No. 8,074,954 (Wilhelm et al.), which discloses a rail for positioning and locking of elements and a corresponding fitting. The rail disclosed includes a running surface having regularly spaced apart projections and indentations. The projections and indentations include holding surfaces, which can be engaged with a fitting so as to stop movement. The Wilhelm et al. reference further discloses a fitting, which includes a notch that can engage recesses in the running surface of the rail. Unfortunately, A-track fittings and L-track fittings would not be compatible with the rail disclosed in the Wilhelm et al. reference.

U.S. Pat. No. 6,892,995 (Tame et al.) is directed to a seat track assembly for adjusting the position of a seat in a vehicle in the forward or backward directions. The track assembly has two lower tracks, which are connected to the floor of a vehicle, and two upper tracks, which are secured to a seat. The upper tracks are configured to slide along the two lower tracks. The Tame et al. reference further discloses a latch system which is fixed to the upper track. The latch locks the positional orientation of the upper tracks relative to the lower tracks so that the seat will not slide while the car is in motion. The cam plate of the latch includes wedge teeth arranged on an end opposite a bore. The wedge teeth extend through apertures in the latch assembly and through apertures of the lower track. In order to adjust the seat position while seated, a user lifts the release lever, and the latch system releases. Unfortunately, the seat track assembly cannot accommodate L-track wheelchair restraints or securements.

Therefore, there has been a long-felt need for a track system that accommodates more than a single track-type fitting. There is a need for a track system that can accommodate an A-track fitting and a L-track fitting. Additionally, there is a need for an easily positionable seat adapter which can be used with transit seating, wheelchairs, and the track described herein.

BRIEF SUMMARY OF THE INVENTION

A track assembly for positioning and removably securing wheelchairs and transit seats in a vehicle, having a first rail having a frame, the frame having a top surface, a first side surface, a second side surface, and a longitudinal axis. The track assembly further includes a plurality of apertures having a shape, the apertures evenly distributed within the top surface along the longitudinal axis of the frame, a plurality of channels connecting the first and second side surfaces proximate the top surface, the channels evenly distributed along the longitudinal axis of the frame, and a second rail identical to and arranged in parallel with the first rail to form the track assembly.

A seat adapter for a floor-mounted track for a transportation vehicle for positioning and removably securing transit seats, having a housing, the housing having a first hook opposite a second hook protruding under a bottom of said housing, respectively, a first aperture opposite a second aperture in the bottom opposite the first and second hooks, respectively, a first slot opposite a second slot arranged along a rear of the housing, respectively, and, a locking means pivotally secured to the housing. The locking means having a first cam arranged within the first aperture of the bottom of the housing, a second cam opposite the first cam and arranged within the second aperture of the bottom, a first lever fixedly secured to the housing and the first cam wherein the first lever arranged within the first slot, a second lever opposite the first lever, the second lever fixedly secured to the housing and the second cam and arranged within the second slot, and a rung fixedly secured to the first and second levers, wherein, to lockingly engage the seat adapter to the track, the hooks are arranged within apertures of the track, the cams are arranged in adjacent apertures of the track, and the rung is depressed, which, in turn, depresses the levers through the slots, and, simultaneously, the cams hook under the adjacent apertures of the track.

A general object of the invention is to provide a convenient track system for positioning and locking cargo, transit seats, and wheelchairs in vehicles.

Another object of the invention is to provide a hybrid track system that combines A-track and L-track systems.

A further object of the invention is to provide a hybrid track system that is a universal platform for different vehicle sizes and different products.

Yet another object of the invention is to provide a seat adapter that lockingly engages with a hybrid track system in an easy and nearly hands-free manner.

Still another object of the invention is to provide a seat adapter that disengages with a hybrid track system in an easy and nearly hands-free manner.

Another object of the invention is to provide a seat adapter that is sturdy, lightweight and easily positionable.

A further object of the invention is to provide a seat adapter that is easily positionable within a hybrid track system.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying figures, in which:

FIG. 2 is a front view of the track of the invention;
FIG. 3 is a rear view of the track of the invention;
FIG. 4 is a top view of the track of the invention;
FIG. 5 is a bottom view of the track of the invention;
FIG. 14 is a left side view of the seat adapter of the invention;
FIG. 15 is a right side view of the seat adapter of the invention.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspect. The present invention is intended to include various modifications and equivalent arrangements within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Track Structure

Figure 1:
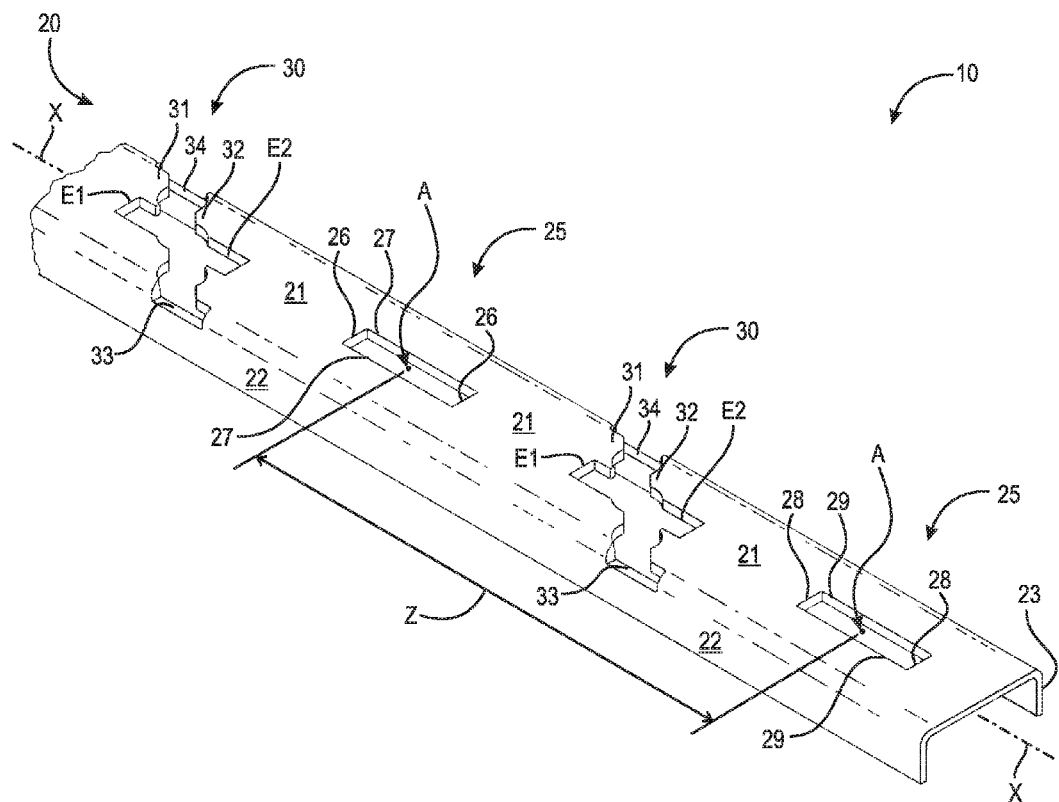
FIG. 1 is a perspective view of the track of the invention.

Adverting now to the Figures, FIG. 1 is a perspective view of track 10 of the invention. Track 10 comprises at least one rail having frame 20 which comprises top surface 21 and sides 22, 23. Top surface 21 connects sides 22, 23 at their respective top ends. Sides 22, 23 are straight and parallel. The top ends of sides 22, 23 are rounded where they abut top surface 21. It should be appreciated that the top ends of sides 22, 23 could be angled or arranged at 90 degrees rather than rounded. Additionally, it should be appreciated that sides 22, 23 could have flanges protruding from their respective bottom ends for desired support or various types of floor-mounting. Top surface 21 is perpendicular to sides 22, 23. Frame 20 further comprises axis X which represents a longitudinal axis running along the center of frame 20. Top surface 21 of frame 20 comprises apertures 25 arranged longitudinally along axis X. Apertures 25 are arranged approximately in the center of top surface 21. Apertures 25 are parallel with sides 22, 23. Moreover, apertures 25 are spaced apart by a distance Z between center points A. Preferably, distance Z is approximately 5 inches according to industry standards.

Apertures 25 are identical. It should be appreciated that apertures 25 are identical to standard apertures in a horizontal or vertical A-track. Each aperture 25 comprises pair of transverse sides 26, 28 and pair of longitudinal sides 27, 29 connecting transverse sides 26, 28. Transverse sides 26, 28 are parallel and longitudinal sides 27, 29 are parallel. Preferably, apertures 25 have a quadrilateral shape; specifically, an open rectangular prism shape without top or bottom sides.

Frame 20 further comprises channels 30 which connect sides 22, 23 across top surface 21. Channels 30 comprise lips 31, 32 and support surfaces 33, 34. Channels 30 are identical. It should be appreciated that channels 30 represent modified portions of a standard L-track. In the preferred embodiment shown, channels 30 further comprise end portions E1, E2 which are identical to the ends of apertures 25 where longitudinal sides 27, 29 meet transverse sides 26, 28. End portions E1, E2 are part of lips 31, 32 arranged between support surfaces 33, 34.

Lips 31, 32 are generally formed by plurality of straight portions 35 and plurality of arcuate portions 36 (described in further detail below). Lips 31, 32 run along top surface 21 between sides 22, 23. Each straight portion within plurality of straight portions 35 alternates with each arcuate portion of plurality of arcuate portions 36 along lips 31, 32. Generally, except for reinforcements 40 (described further below), frame 20 is hollow under top surface 21. Track 10 comprises at least one rail having frame 20 arranged opposite and parallel to a second rail having frame 20A (described further below). Frames 20, 20A are identical.

FIG. 2 shows a front view of frame 20. Top surface 21 is planar and apertures 25 are planar. Apertures 25 are not visible behind the rounded top end of side 22. Channels 30 are visible through the rounded top end of side 22. Supportive surfaces 33 are shoulder-like portions within side 22. Supportive surfaces 33 are parallel with top surface 21. Plurality of straight portions 35 and plurality of arcuate portions 36 are visible along lips 32 which connect side 22 to side 23 protruding behind side 22. L-track fittings are arranged to slidingly engage channels 30. Supportive surfaces 33 provide support for such fittings. FIG. 3 shows a rear view of frame 20 which is substantially similar to frame 20 shown in FIG. 2. Frame 20 shown in FIG. 3 differs in that channels 30 intersect with side 23 rather than side 22. Moreover, support surfaces 34 are shown distributed along side 23. Support surfaces 34, like support surfaces 33, are shoulder-like portions within side 23 and are parallel with top surface 21. Lips 31 are visible protruding behind side 23 connecting side 23 to side 22 along top surface 21. Plurality of straight and arcuate portions 35, 36 are visible along lips 31. It should be appreciated that FIGS. 2 and 3 are not identical because channels 30 are diagonally arranged between sides 22, 23.

FIG. 4 is a top view of frame 20. Support surfaces 33, 34 of channels 30 are positioned below the rounded top ends of sides 22, 23, respectively. Plurality of straight and arcuate portions 35, 36 of lips 31, 32 of channels 30 are shown alternating. From the top, right-most portion of channels 30, lip 32 proceeds, starting from side 23, with arcuate portion 35, straight portion 36, arcuate portion 35, end E2, straight portion 36, arcuate portion 35, and straight portion 36. Straight portions 36 have varying lengths due to the diagonal nature of lip 32. End E2 includes three straight sides of an open rectangular prism. The longitudinal side of end E2 proximate side 23 is longer than the longitudinal side of end E2 proximate side 22 due to the diagonal nature of channels 30. The transverse side of the partial rectangular prism shape of end E2 connects the longitudinal sides of end E2. Lip 31 is opposite lip 32 within channels 30. For clarity, lip 32 is annotated in channel 30 positioned between two apertures 25. Lip 31 is annotated in channel 30 positioned on the left. It should be appreciated that lips 31, 32 are identical in both channels 30 illustrated in FIG. 4. From the top, left-most portion of channels 30, lip 31 proceeds, starting from side 23, with straight portion 36, arcuate portion 35, straight portion 36, end E1, arcuate portion 35, straight portion 36, and arcuate portion 35. Again, straight portions 36 have varying lengths due to the diagonal nature of lip 31. End E1 includes three straight sides of an open rectangular prism. The longitudinal side of end E1 proximate side 23 is shorter than the longitudinal side of end E1 proximate side 22 due to the diagonal nature of channels 30. Both ends E1, E2 are open on the top and bottom ends to receive fittings.

Similarly, apertures 25 are nearly rectangular prisms except apertures 25 have open top and bottom faces to receive fittings. FIG. 5 is a bottom view of frame 20 showing reinforcements 40. Reinforcements 40 are welded and connect sides 22, 23 proximate bottom ends of sides 22, 23, respectively. Reinforcements 40 are correspondingly shaped to reinforce channels 30. At the center of reinforcements 40, bolts 41 are arranged to be secured to a floor surface. It should be appreciated that any suitable secure means could be used to secure reinforcements 40 to a floor surface for example, screws, nails, pins, soldering, brazing, welding, or cementing. Additionally, each reinforcement 40 can have more than a single bolt 41 if desired.

Figure 6:
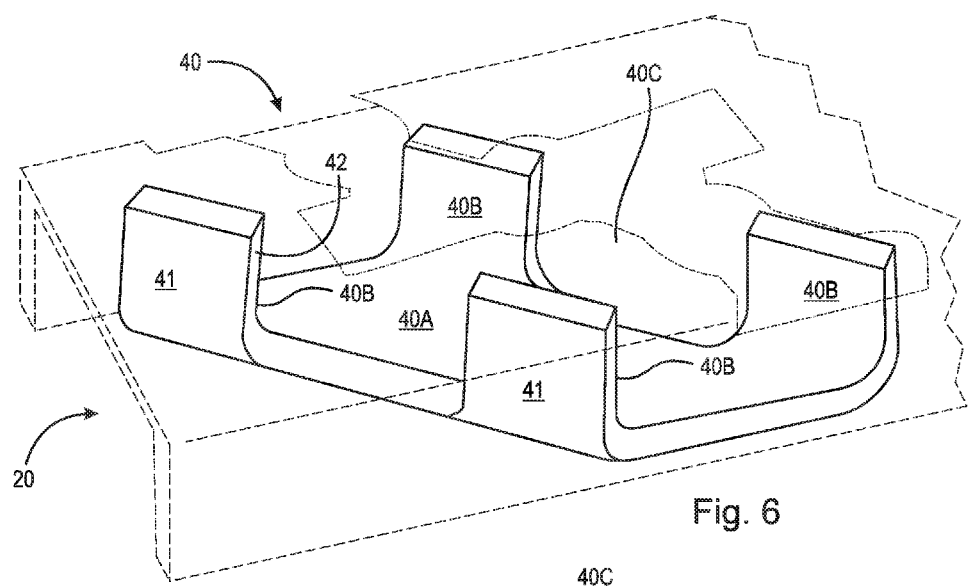
FIG. 6 is a perspective view of the reinforcement of the invention shown in FIG. 5 with the frame cut away.

FIG. 6 is a perspective view of frame 20 and reinforcement 40 of the invention. Reinforcement 40 comprises base 40A and flanges 40B. As shown in FIG. 5, base 40A is correspondingly shaped with channels 30 and is arranged opposite top surface 21 of frame 20. Flanges 40B are extensions connecting base 40A to top surface 21 and sides 22, 23 of frame 20. Flanges 40B are welded to sides 22, 23 and top surface 21. In the preferred embodiment, flanges 40B are arranged on the corners of base 40A proximate sides 22, 23. It should be appreciated that flanges 40B could be arranged in any suitable manner to support channels 30. For example, flanges 40B could be a continuous side wall protruding upward from base 40A between sides 22, 23. However, in the preferred embodiment, flanges 40B are not continuous between sides 22, 23. Instead, openings 40C are arranged between flanges 40B proximate bolts 41 so that a user can access bolts 41. Openings 40C additionally decrease the overall mass of frame 20 making frame 20 lightweight and easy to maneuver.

Figure 7A:
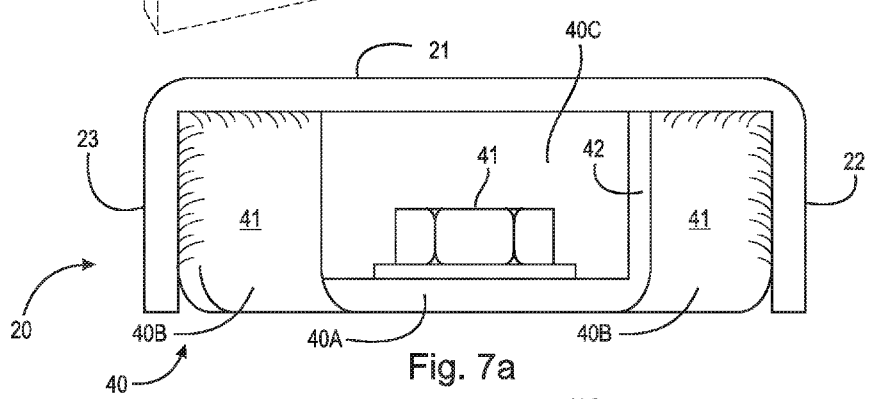
FIG. 7A is a left side view of the track of the invention.
Figure 7B:
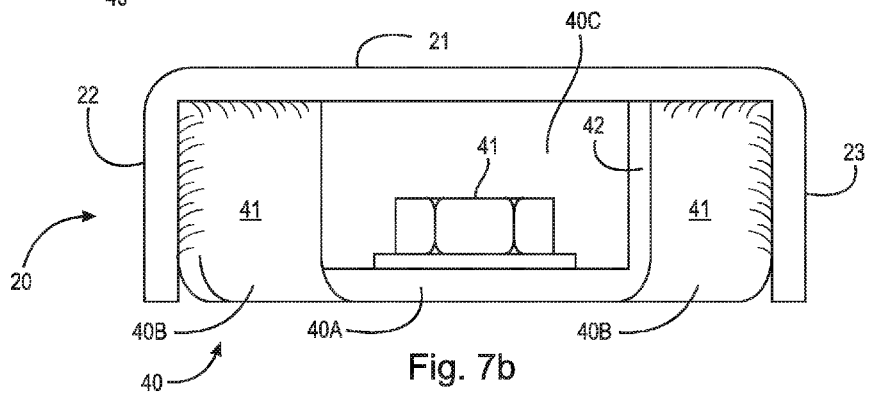
FIG. 7B is a right side view of the track of the invention.

FIG. 7A is a left side view, or a left end view, of frame 20 and reinforcement 40. Flange 40B arranged proximate side 22 is welded along side 22 and top surface 21. Only exterior surface 41 of flange 40B is visible because reinforcement 40 is arranged diagonally between sides 22, 23, respectively. Side surface 42 is not visible. Base 40A is behind flange 40B proximate side 22. In contrast, exterior surface 41 and side surface 42 are visible of flange 40B proximate side 23. Side surface 42 is visible proximate side 23 because reinforcement 40 is welded to side 23 at an angle corresponding to the angle of channels 30. Side surface 42 connects to base 40A proximate the bottom of flange 40B seamlessly. FIG. 7B is a right side view, or a right end view, of frame 20 and reinforcement 40. FIG. 7B is identical to FIG. 7A. Flange 40B proximate side 23 is welded along side 23 and top surface 21. Only exterior surface of flange 40B is visible. Side surface 42 is not visible. In contrast, exterior surface 41 and side surface 42 are visible with respect to flange 40B welded proximate side 22.

Figure 8:
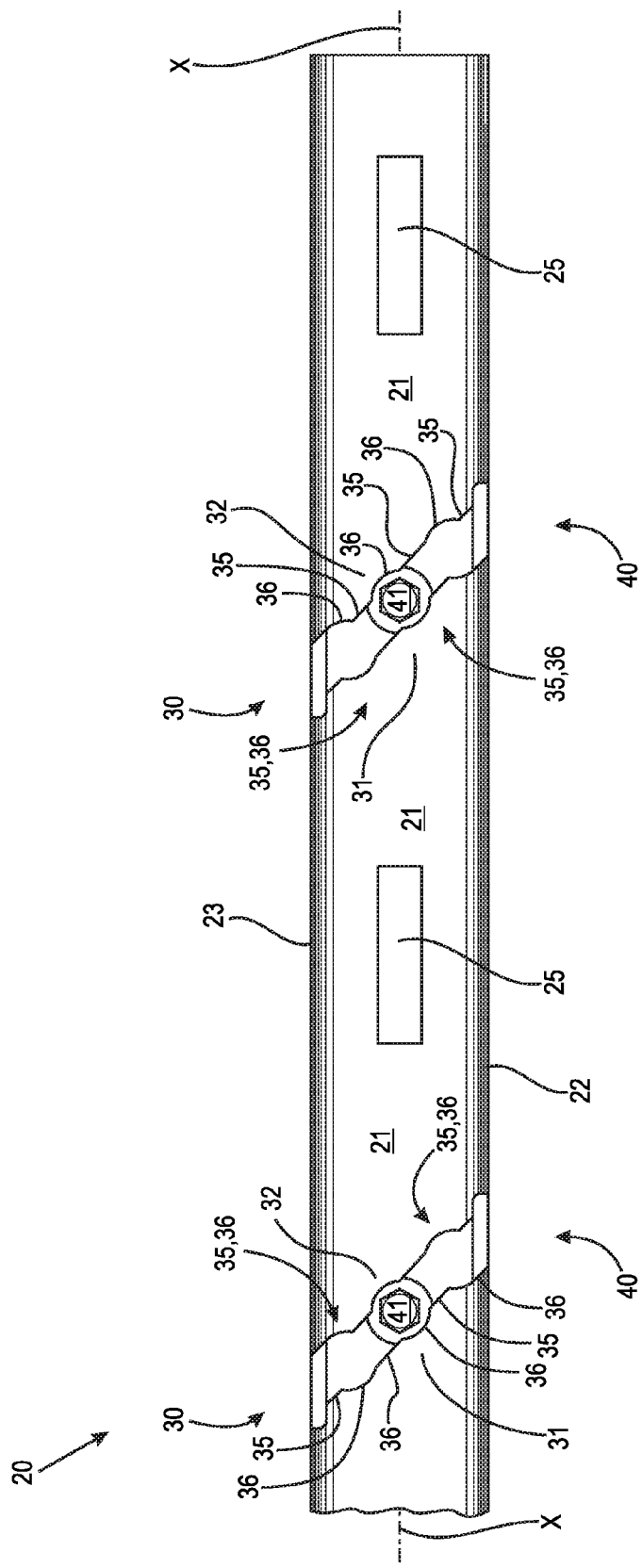
FIG. 8 is an alternate embodiment of the track of the invention.

FIG. 8 is a top view of an alternate embodiment of frame 20 showing channels 30 without ends E1, E2. Channels 30, in this embodiment, comprise lips 31, 32 and lips 31, 32 comprise plurality of arcuate and straight portions 35, 36 but, exclude ends E1, E2 as included in the preferred embodiment. Lips 32 comprise, from the portion proximate side 23, arcuate portion 35, straight portion 36, arcuate portion 35, straight portion 36, arcuate portion 35, and straight portion 36. Lips 31 comprise, from the portion proximate side 23, straight portion 36, arcuate portion 35, straight portion 36, arcuate portion 35, straight portion 36, and arcuate portion 35. Bolts 41 are arranged in reinforcements 40 approximately in the center of frame 20 below lips 31, 32 of channels 30. In a further embodiment, frame 20 could comprise any arrangement of apertures 25 and channels 30. Instead of alternating apertures 25 and channels 30, frame 20 could include a plurality of apertures 25 arranged adjacent one another followed by a plurality of channels 30 arranged adjacent one another. Alternatively, frame 20 could include two apertures 25 arranged adjacent one another followed by two channels 30 arranged adjacent one another. Additionally, it should be appreciated that apertures 25 could be arranged transversely to longitudinal axis X to mimic standard horizontal A-track. Apertures 25 could be modified to emulate standard horizontal and vertical E-tracks. Apertures 25 can even be substituted with circular apertures of the typical F-track. Frame 20 of the instant invention can be arranged in any suitable manner to accommodate any number of track fittings and should not be construed to be limited to A and L tracks. Frame 20 could include a horizontal aperture 25, a vertical aperture 25, a circular aperture of the typical F-track, and channels 30 of the preferred and alternate embodiments in any pattern, i.e., sequential or alternating.

It should be appreciated that channels 30 are substantially similar to the standard L-track. Channels 30 alone without ends E1, E2 comprise three equidistant circular apertures separated by straight portions 36 of lips 31, 32. Straight portions 36 of lips 31, 32 are closer together than the diameters of the circular apertures. The distance between the center points of adjacent circular apertures is approximately 1 inch according to industry standards. The diameter of each circular aperture is approximately 20 millimeters according to industry standards.

Channels 30 are arranged to receive wheelchair tie downs and other L-track fittings. Track 10 can include a plurality of frames 20 mounted within the floor of a vehicle to accommodate any number of seating arrangements. Consistent with the Americans with Disabilities Act, in order to accommodate a wheelchair, a minimum amount of floor space is required (30 inches by 48 inches). Accordingly, track 10 can be arranged with a floor space of a transportation means at least 30 inches by 48 inches. Apertures 25 are arranged to receive A-track fittings. Each aperture is approximately 6.2 centimeters long (or 2.4 inches) by 1.3 centimeters wide (or approximately 0.5 inches).

Seat Adapter Structure

Figure 9:
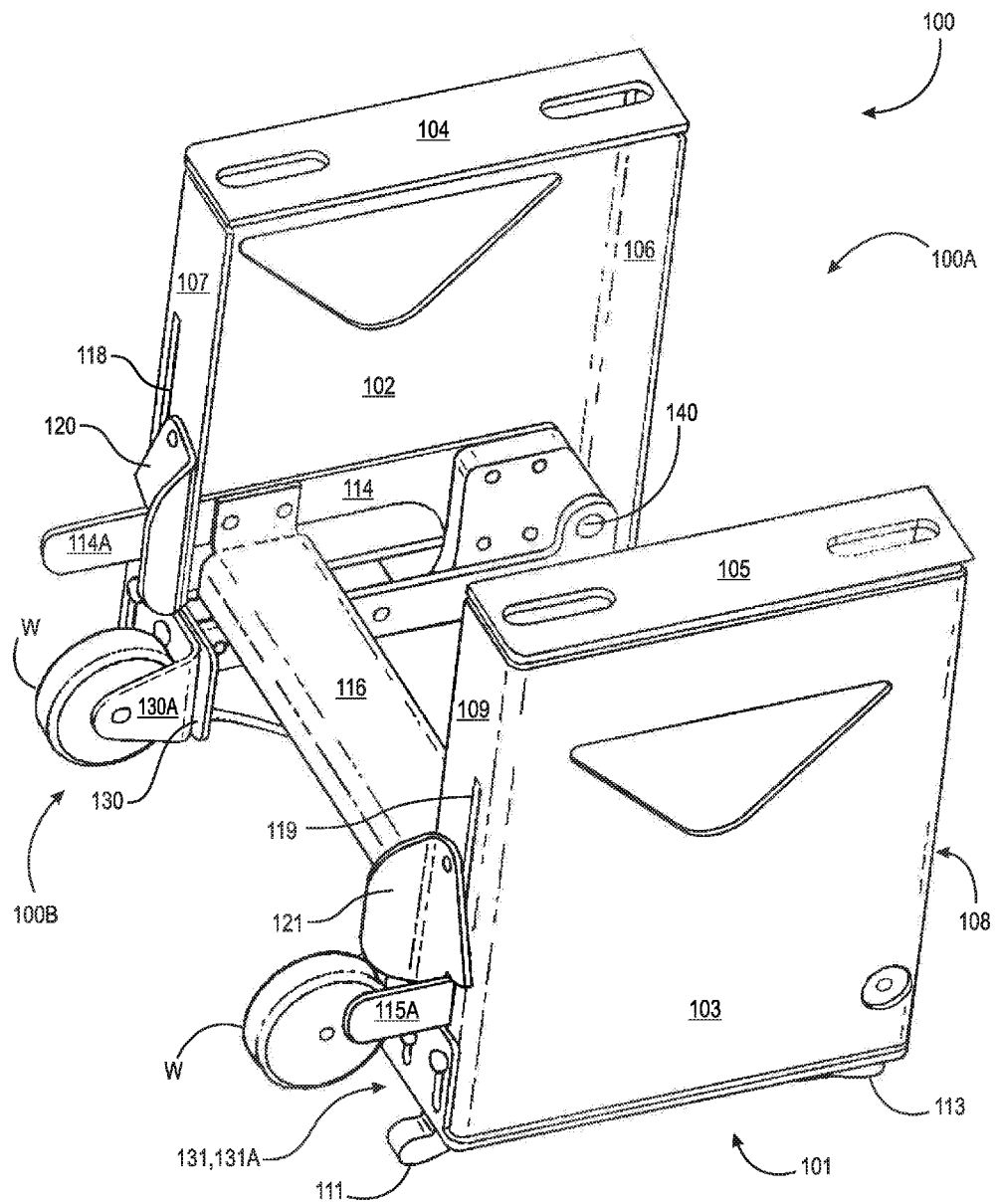
FIG. 9 is a perspective view of the seat adapter of the invention.

FIG. 9 shows a perspective view of seat adapter 100. Broadly, seat adapter 100 comprises housing 100A and locking system 100B. Housing 100A comprises bottom 101, left side 102, right side 103, top of left side 104, top of right side 105, front of left side 106, rear of left side 107, front of right side 108, and rear of right side 109. Left and right sides 102, 103 are substantially upright and parallel. Bottom 101 connects left and right sides 102, 103 at their respective bottom ends. Tops of left and right sides 104, 105 are arranged to receive a transit seat. Tops of left and right sides 104, 105 do not connect. However, it should be appreciated that tops of left and right sides 104, 105 could connect to provide greater support for a transit seat fixedly secured above. Similarly, front of left side 106 does not connect to front of right side 108 and rear of left side 107 does not connect to rear of right side 109. Left and right sides 102, 103 are connected by bottom 101 and locking system 100B. It should be appreciated that housing 100A is preferably made of aluminum or titanium based metals. However, housing 100A could be constructed of any suitable alternative such as iron, steel, or even a sturdy plastic.

Housing 100A further comprises extension members 130, 131 extending from rear of left side 107 and rear of right side 109, respectively, proximate bottom 101. Wheels W are fixedly secured to L-shaped extension members 130A, 131A which, in turn, are secured to extension members 130, 131. Wheel W is fixedly secured to L-shaped extension member 130A and another wheel W is fixedly secured to L-shaped extension member 131A. Wheels W are identical. Wheels W enable a user to transport seat adapter 100 and a seat fixedly secured thereto. Wheels W also enable a user to guide seat adapter 100 alongside the inward facing walls of parallel frames 20, 20A of track system 50. Hooks 110, 111 are fixedly secured to and protrude downwardly and rearwardly from under bottom 101 proximate wheels W, respectively. Wheels W can be any suitable wheel and/or caster. For example, wheels W could be pneumatic, phenolic, made of rubber, made of polyurethane and threaded, pressed steel, or nylon. Wheels W can be custom made at J. W. Winco located at 2815 South Calhoun Road, New Berlin, Wis. 53151. Alternatively, a typical wheel and fixed caster can be used.

Housing 100A also comprises slots 118, 119 arranged along rear of left side 107 and rear of right side 109, respectively. Locks 120, 121 are also arranged on rear of left side 107 and rear of right side 109, respectively, proximate slots 118, 119, respectively. Slots 118, 119 are arranged to receive levers 114, 115 of locking system 100B. Levers 114, 115 can be moved vertically within slots 118, 119 (described in further detail below).

Locking system 100B comprises cams 112, 113, levers 114, 115, and rung 116. Cams 112, 113 protrude through and under bottom 101 opposite hooks 110, 111 and wheels W. Cams 112, 113 are fixedly secured to levers 114, 115 secured within housing 100A. Rung 116 connects levers 114, 115 proximate rear of left and right sides 107, 109, respectively.

FIGS. 9 through 15 show seat adapter 100 in the locked position. Levers 114, 115 are substantially parallel with bottom 101 and tops of right and left sides 104, 105. Locks 120, 121 engage the tops of lever ends 114A, 115A of levers 114, 115, respectively. Wheels W are suspended above the floor surface and cams 112, 113 are in locked position arranged under bottom 101 and forward of fronts of left and right sides 106, 108 opposite hook 110, 111. In this arrangement, cams 112, 113 protrude beyond the front side of bottom 101. As described below, when seat adapter 100 and locking system 100B are in the unlocked position, levers 114, 115 are arranged at angle β in relation to bottom 101 (as shown in FIG. 18B). When cams 112, 113 are in the unlocked position, cams 112, 113 are completely under bottom 101 and do not protrude beyond the front side of bottom 101.

Figure 10:
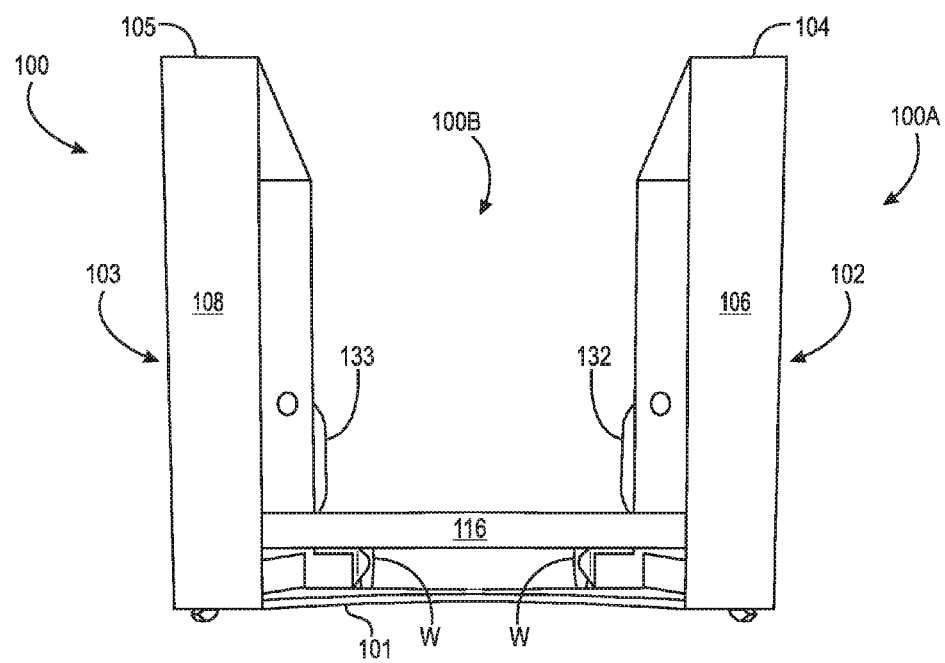
FIG. 10 is a front view of the seat adapter of the invention.
Figure 11:
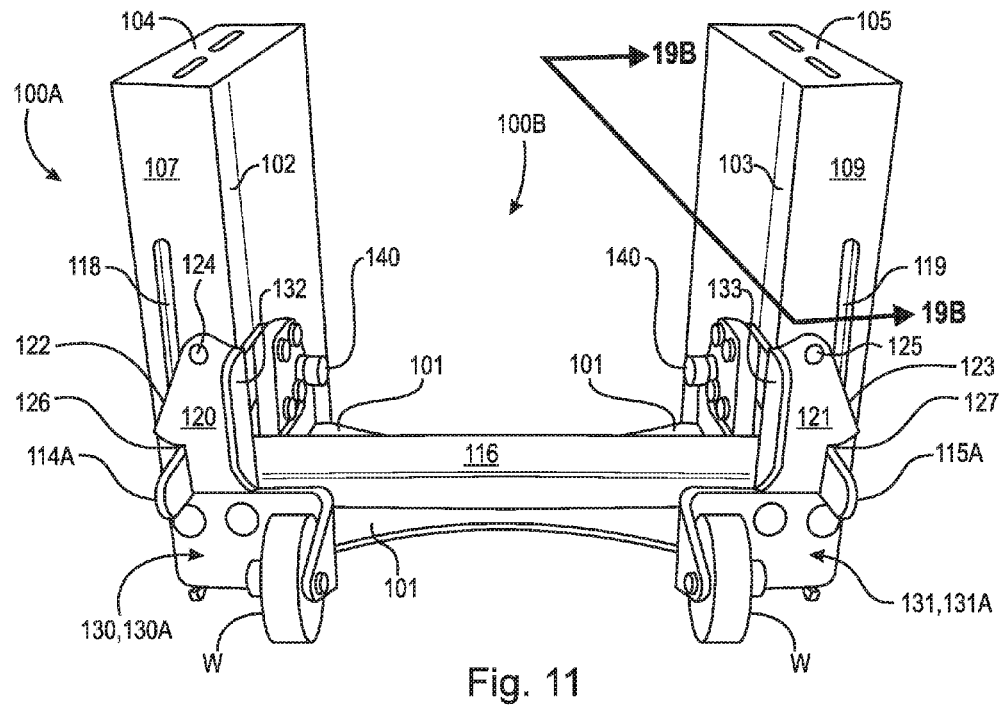
FIG. 11 is a rear view of the seat adapter of the invention.

Seat adapter 100 is shown from the front in FIG. 10. Fronts of left and right sides 106, 108 are spaced apart and connected only by bottom 101 and rung 116 of locking system 100B. In the locked position shown, rung 116 is opposite tops of left and right sides 104, 105. Additionally, rung 116 is substantially parallel and proximate bottom 101. Wheels W are visible behind rung 116 suspended above the floor surface. FIG. 11 shows the rear of seat adapter 100. Rears of left and right sides 107, 109 are spaced apart and connected by bottom 101 and rung 116 of locking system 100B. Slots 118, 119 of respective rear sides 107, 109 are arranged vertically to slidingly receive levers 114, 115, respectively. Locks 120, 121 are secured to rear sides 107, 109, respectively, proximate slots 118, 119, respectively, by means of lock bolts 124, 125. Locks 120, 121 are arranged to rotate freely around lock bolts 124, 125. When seat adapter 100 is in the locked position, gravity dictates the vertical alignment of locks 120, 121 and levers 114, 115 prevent locks 120, 121 from swinging.

Locks 120, 121 comprise respective angled sides 122, 123, respective shoulders 126, 127, and respective appendages 132, 133. Angled sides 122, 123 and shoulders 126, 127 are substantially parallel with rear left and right sides 107, 109, respectively. Appendages 132, 133 are substantially perpendicular to angled sides 122, 123 and shoulders 126, 127 of locks 120, 121. Angled sides 122, 123 are angled downwardly so that when levers 114, 115 engage them from above lock bolts 124, 125, levers 114, 115 push locks 120, 121 inward and upward around lock bolts 124, 125 so that levers 114, 115 can continue to pass through slots 118, 119. Locks 120, 121 are mirror images such that each angled side 122, 123 is directed away from the other. Wheels W are arranged behind rear left and right sides 107, 109 proximate left and right sides 102, 103 such that a user can easily position his/her foot between wheels W.

Figure 12:
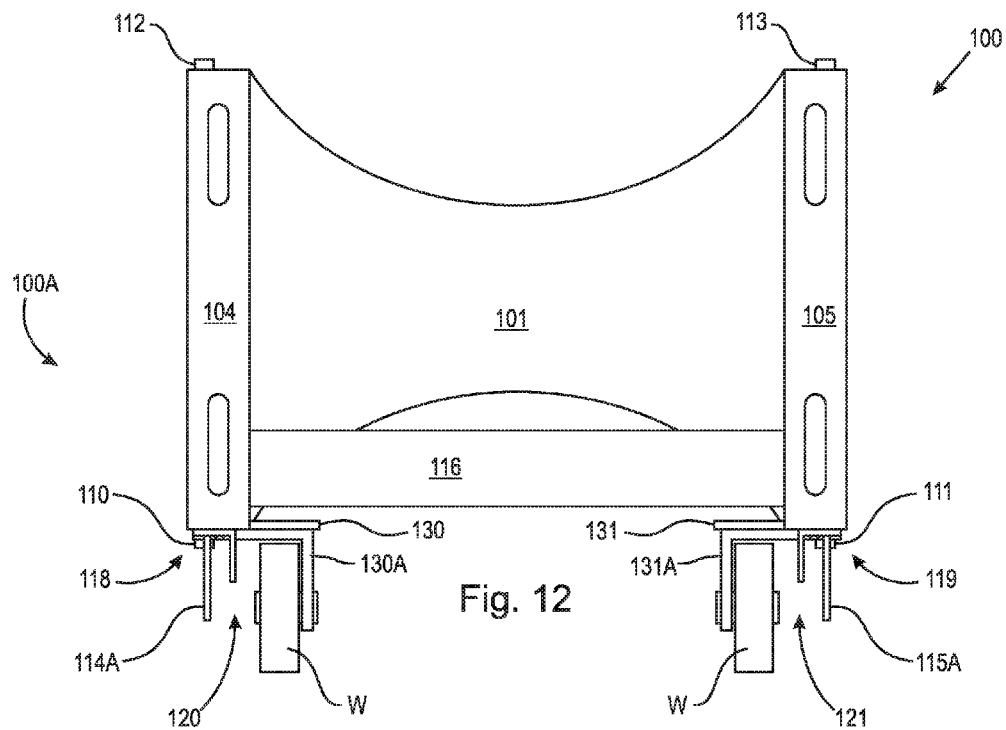
FIG. 12 is a top view of the seat adapter of the invention.
Figure 13:
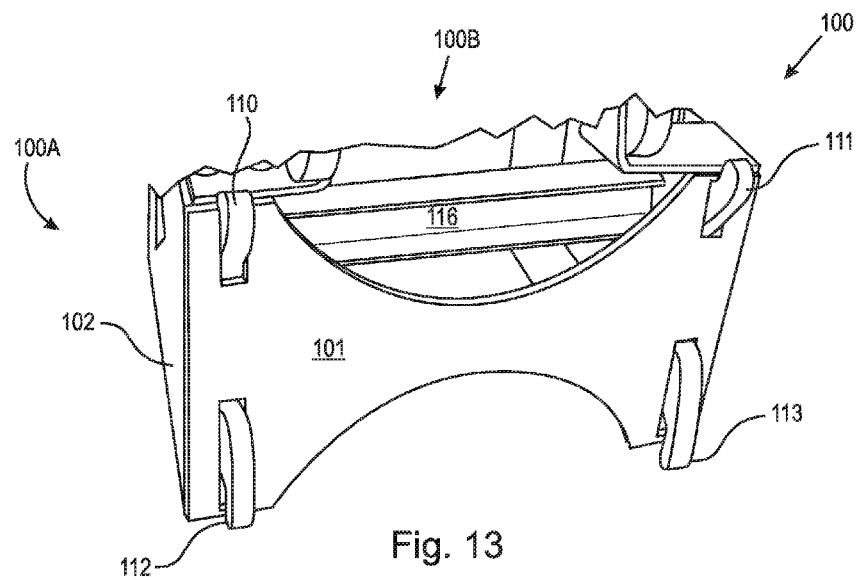
FIG. 13 is a bottom view of the seat adapter of the invention.

FIG. 12 shows tops of left and right sides 104, 105 of housing 100A of seat adapter 100. From this view, cams 112, 113 are visible above bottom 101. Levers 114, 115 are resting along the respective bottoms of slots 118, 119. Lever ends 114A, 115A are visible through slots 118, 119, respectively. Locks 120, 121 are resting atop lever ends 114A, 115A of levers 114, 115. Hooks 110, 111 are visible below bottom 101 opposite cams 112, 113. FIG. 13 shows bottom 101 of housing 100A of seat adapter 100. Hook 110 is shown protruding from bottom 101 proximate left side 102 and opposite cam 112. Hook 111 is shown protruding from bottom 101 proximate right side 103 and opposite cam 113. Cam 112 is in the locked position and protruding outwardly from bottom 101 proximate left side 102. Cam 113 is in the locked position protruding outwardly from bottom 101 proximate right side 103. Bottom 101 has a semi-circular aperture connecting front left and right sides 106, 108. Similarly, bottom 101 has a semi-circular aperture connecting rear left and right sides 107, 109. These semi-circular apertures allow a user to stand on either the front or rear side of a seat and seat adapter 100 and move the seat and seat adapter 100 without having bottom 101 of seat adapter 100 interfere with the gait of the user.

Left side 102 of seat adapter 100 is shown in FIG. 14. Lever end 114A is protruding outwardly from slot 118 and lever end 114A is substantially parallel to the floor surface. Wheel W is suspended above the floor surface. Hook 110 is protruding outwardly from bottom 101 and cam 112 is protruding outwardly from bottom 101 in the opposite direction. When seat adapter 100 is lockingly engaged with frame 20 of track 10, hook 110 engages under top surface 21 through aperture 25 and cam 112 engages under top surface 21 through an adjacent aperture 25.

Similarly, right side 103 of seat adapter 100 is shown in FIG. 15. Lever end 115A is protruding outwardly from slot 119 and lever end 115A is substantially parallel to the floor surface. Wheel W is suspended above the floor surface. Hook 111 is protruding outwardly from bottom 101 and cam 113 is protruding outwardly from bottom 101 in the opposite direction. When seat adapter 100 is lockingly engaged with track 10, hook 110 engages under top surface 21 through aperture 25 and hook 111 engages under top surface 21 through aperture 25 of a parallel frame. Likewise, cam 112 engages under top surface 21 through aperture 25 and cam 113 engages under top surface 21 through aperture 25 of a parallel frame.

Function

Once track system 50 is installed, a user can secure a number of desired transit seats each fixed atop seat adapter 100 inside the cabin of a vehicle. For example, a flip style transit seat made by Freedman Seating Company located at 4545 West Augusta Boulevard, Chicago, Ill. 60651 can be mounted with bolts to top of left side 104 and top of right side 105 of seat adapter 100. Other flip style transit seats and fixed seats are also compatible with seat adapter 100. Track system 50 comprises frame 20 spaced apart from and parallel with frame 20A. Track system 50 can include additional frames depending on the desired seating arrangement.

Figure 16:
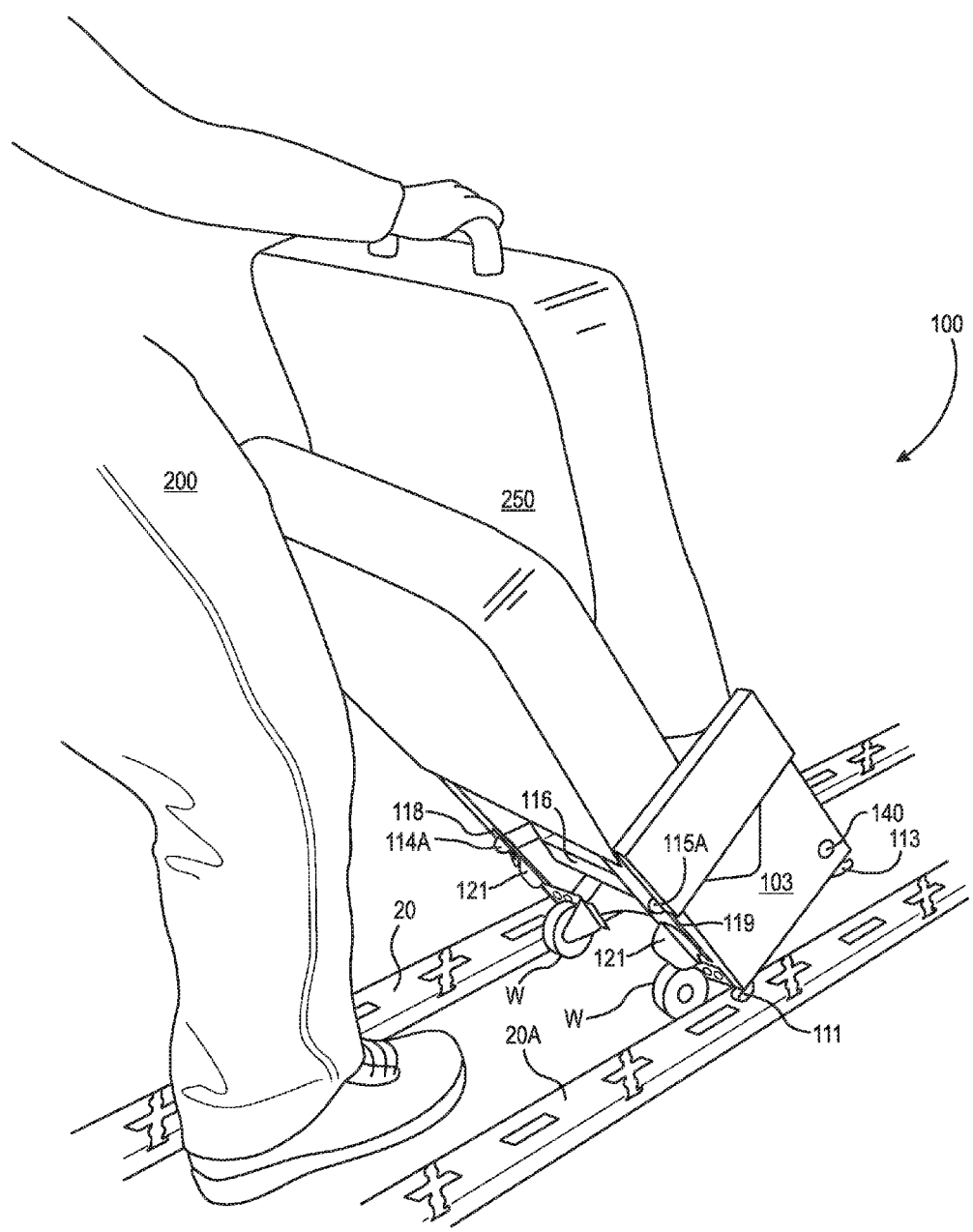
FIG. 16 is a view of a user wheeling the seat adapter of the invention along the track of the invention.

To secure desired transit seat 250 fixed atop seat adapter 100, user 200, as shown in FIG. 16, tilts seat 250 and seat adapter 100 onto wheels W and rolls seat 250 and seat adapter 100 forward together. User 200 arranges wheels W between frames 20, 20A such that one wheel W is guided by frame 20 and another wheel W is guided by frame 20A. When seat 250 and seat adapter 100 are positioned for storage (to be described below) or for use, a user aligns hooks 110, 111 with opposing apertures 25 arranged in frames 20, 20A.

Figure 17:
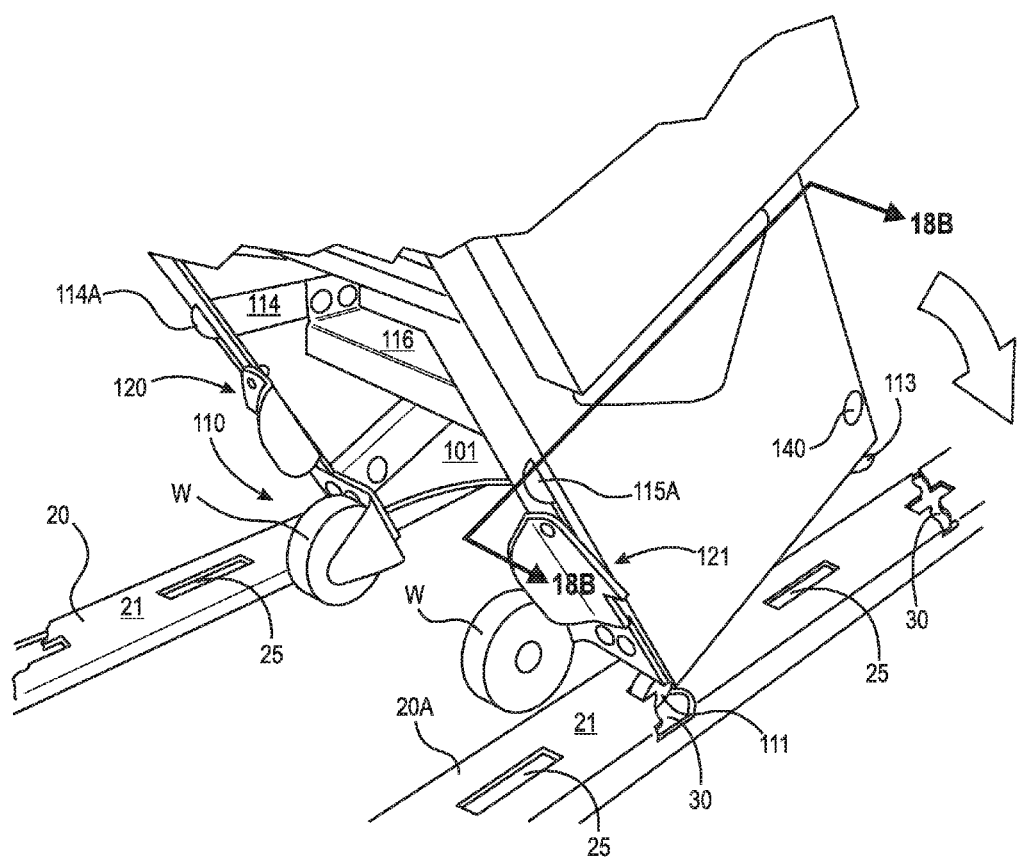
FIG. 17 is a view of a user positioning the seat adapter of the invention within the track of the invention.

Then, as shown in FIG. 17, user 200 tilts seat 250 and seat adapter 100 forward such that hooks 110, 111 protrude into opposing apertures 25 and respectively hook under top surfaces 21 of frames 20, 20A behind the protruded apertures 25. As seat 250 and seat adapter 100 are tilted forward further and hooks 110, 111 are hooked in place, bottom 101 of seat adapter 100 comes into contact with top surfaces 21 of frames 20, 20A. As seat adapter 100 comes into full contact with frames 20, 20A, cams 112, 113 protrude into adjacent and opposing apertures 25 in frames 20, 20A. Hooks 110, 111 engage with parallel apertures 25 of frames 20, 20A, respectively, and cams 112, 113 engage with separate adjacent parallel apertures 25 of frames 20, 20A.

Figure 18A:
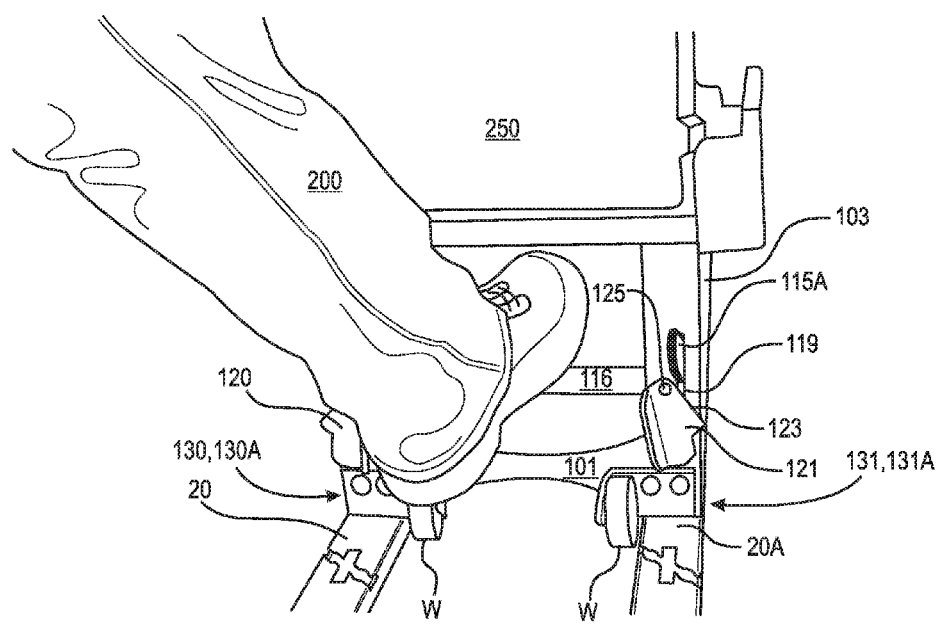
FIG. 18A is a view of a user locking the seat adapter of the invention within the track of the invention.
Figure 18B:
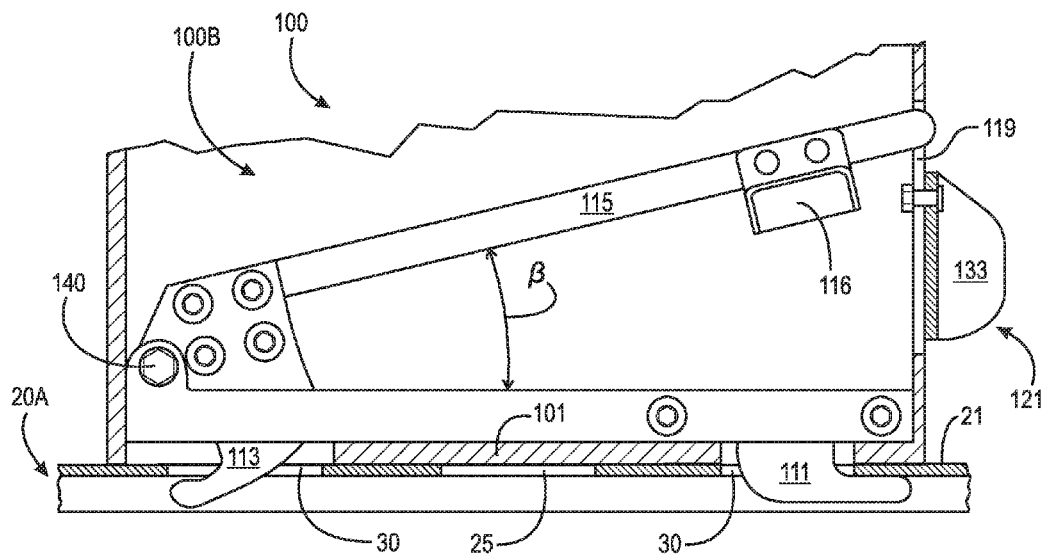
FIG. 18B is a cross section view of the locking system of the seat adapter engaged within the track of the invention showing the seat adapter in the unlocked position.
Figure 19A:
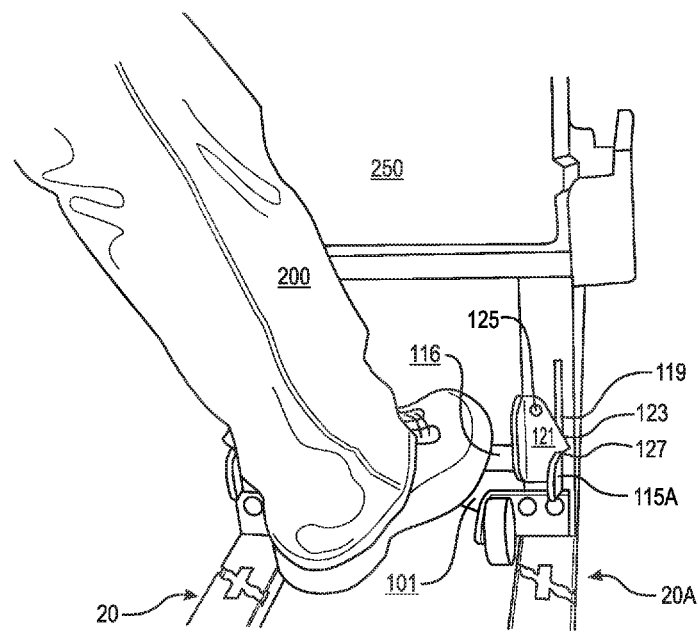
FIG. 19A is a view of the locking system of the seat adapter locked by a user and engaged within the track of the invention.

FIG. 18A shows how user 200 secures seat 250 and seat adapter 100 in track system 50. Once seat 250 and seat adapter 100 are positioned in apertures 25, user 200, using a single foot, steps downward on top of rung 116. As rung 116 is pressed downward, levers 114, 115 slide downward. As discussed above, lever ends 114A, 115A of levers 114, 115, protrude rearwardly through slots 118, 119, respectively. As rung 116 is pressed downward, lever ends 114A, 115A slide downwardly through slots 118, 119 and lever ends 114A, 115A come in contact with locks 120, 121 along their respective angled sides 122, 123; locks 120, 121 are rotated partially around lock bolts 124, 125. It should be appreciated that while locks 120, 121 are swing, levers 114, 115 can continue to slide downwardly through slots 118, 119 passing lock bolts 124, 125. When levers 114, 115 abut the respective bottoms of slots 118, 119, locks 120, 121 swing back such that shoulders 126, 127 engage atop lever ends 114A, 115A again as shown in FIG. 19A. FIG. 18A illustrates only the portion of housing 100A that interacts with frame 20A but it should be appreciated that the other portion of housing 100A that interacts with frame 20 functions the same.

Figure 19B:
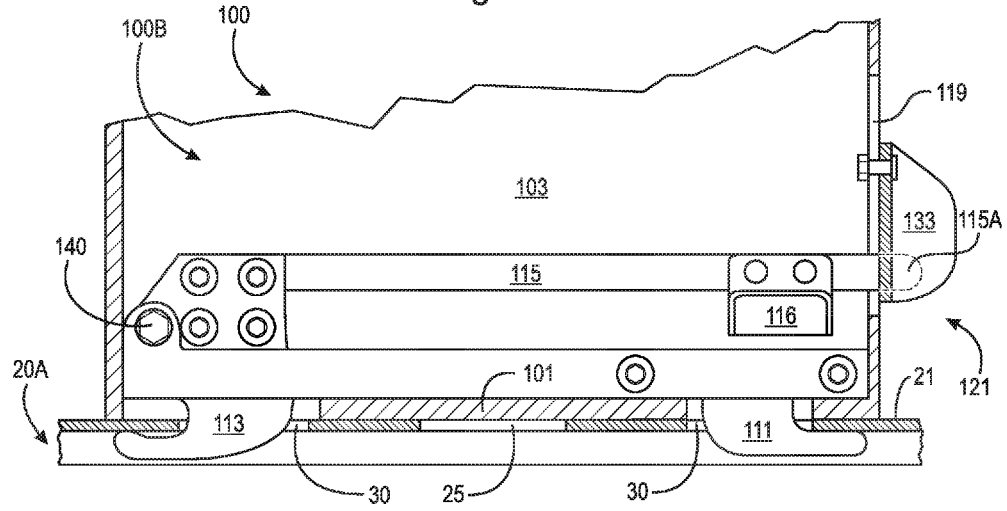
FIG. 19B is a cross section view of the locking system of the seat adapter engaged within the track of the invention showing the seat adapter in the locked position.

The unlocked position of locking system 100B is shown in cross-section in FIG. 18B taken generally along line 18B-18B shown in FIG. 17. Seat adapter 100 is positioned such that bottom 101 is resting atop frame 20A. Hook 111 is positioned in aperture 25 such that it is hooked under top surface 21 of frame 20A. Cam 113 is arranged within a separate adjacent aperture 25 of frame 20A. Lever 115 is arranged lifted upward at angle β. Since locking system 100B is in the unlocked position, cam 113 is not hooked under top surface 21 of frame 20A. Lever 115 and cam 113 rotate about pivot 140. Lock 121 is in its default position partially covering slot 119. Appendage 133 of lock 121 is shown projecting outwardly such that it should be appreciated that user 200 could swing lock 121 out of the way using a single foot. FIG. 19A shows rung 116 fully pressed downward and locking system 100B is in locked position. Lever end 115A is resting atop the bottom of slot 119. Lock 121 has swung back and lock 121 is again partially covering slot 119. Shoulder 127 of lock 121 is resting atop lever end 115A. Rung 116 is again proximate bottom 101. Wheels W are still suspended off the floor surface. As shown in FIG. 19B, in the locked position, cam 113 pivots forward about pivot 140 to hook under top surface 21 of frame 20A. In this arrangement, lever 115 is proximate to and parallel with bottom 101. FIG. 19B is a cross section of locking system 100B taken generally along line 19B-19B shown in FIG. 11.

Figure 20A:
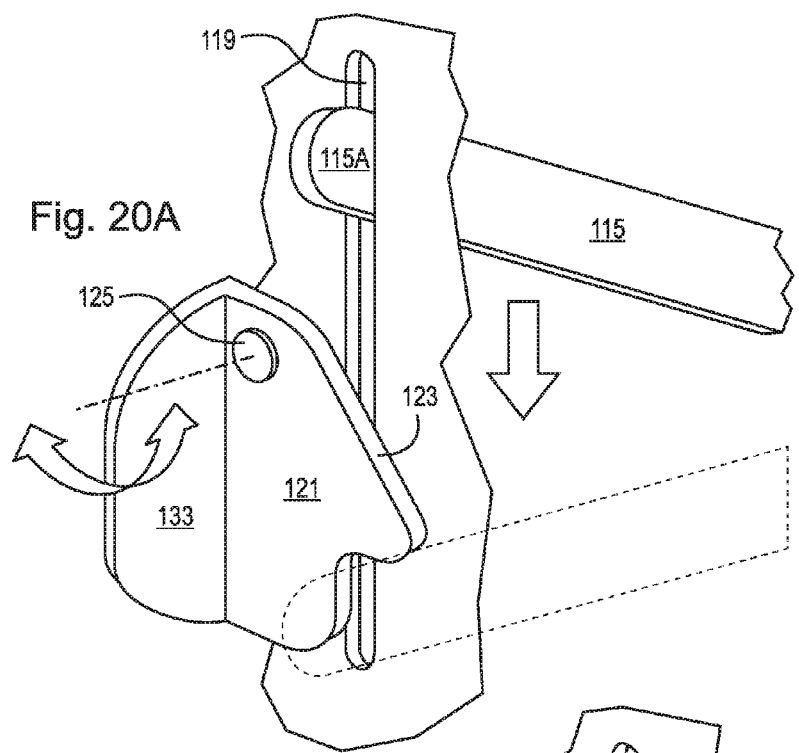
FIG. 20A is a detailed view of part of the locking system of the seat adapter showing the lever sliding downwardly and interacting with the safety lock of the seat adapter.
Figure 20B:
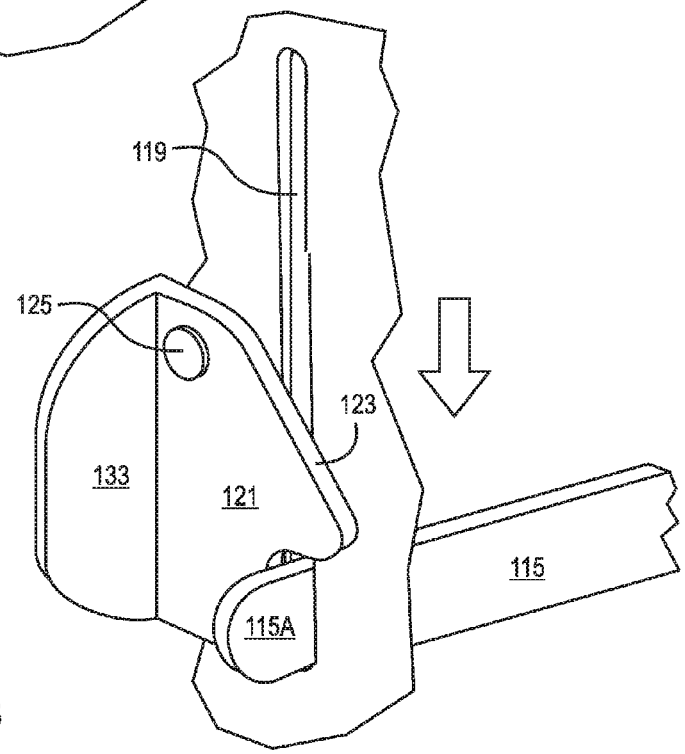
FIG. 20B is a detailed view of part of the locking system of the seat adapter showing the lever and safety lock in the locked position.

FIG. 20A shows a detail view of the interaction between lever 115 and lock 121 when rung 116 is pressed downward. As discussed above, when rung 116 is pressed downward, lever 115 secured to rung 116 is also pressed downward. Lever 115 is guided downward through slot 119. When lever end 115A contacts angled side 123 of lock 121, lock 121 swings around lock bolt 125 in the leftward direction shown. As lock 121 swings leftwardly, lever 115 is allowed to continue downward through slot 119. FIG. 20B shows a detail of lever 115 and lock 121 after rung 116 has been fully pressed downward. Shoulder 127 of lock 121 is resting atop lever end 115A.

To disengage seat adapter 100 from track system 50, user 200 first rotates locks 120, 121 around lock bolts 124, 125. To rotate locks 120, 121 around lock bolts 124, 125, user 200 moves appendages 132, 133 inwardly, up and around lock bolts 124, 125 with his/her foot. Once appendages 132, 133 are rotated around lock bolts 124, 125, the straight sides of locks 120, 121 rest on the outward facing sides of lever ends 114A, 115A. With the straight sides of locks 120, 121 resting on the outward facing sides of lever ends 114A, 115A, user 200 places a single foot under rung 116 and lifts rung 116 upward. Levers 114, 115 slide upwardly through slots 118, 119 and pass lock bolts 124, 125 unimpeded by shoulders 126, 127 of locks 120, 121. As rung 116 is lifted upward and levers 114, 115 pass lock bolts 124, 125, locks 120, 121 slide back into their original positions by force of gravity. Simultaneously, as rung 116 is lifted upward, cams 112, 113 retract from under top surfaces 21 of frames 20, 20A and slide under bottom 101 of housing 100A.

When rung 116 is fully lifted and cams 112, 113 are retracted under housing 100A, user 200 removes his/her foot and rung 116 and levers 114, 115 remain lifted. Rung 116 and levers 114, 115 remain lifted due to friction about pivot 140. The friction adds to the resistance load present in the levering system such that the total resistance load has a torque sufficient to overcome the torque created by the levering system alone and gravity. This friction plus cams 112, 113 positioned opposite levers 114, 115 about pivot 140 enable user 200 to raise and lower rung 116 in a controlled manner. With rung 116 raised and cams 112, 113 retracted, user 200 simply tilts seat 250 and seat adapter 100 backward onto wheels W. Cams 112, 113 are lifted out of apertures 25 and hooks 110, 111 are extricated from adjacent apertures 25. With hooks 110, 111 disengaged from track system 50, user 200 is free to roll seat adapter 100 to another position along track system 50 or remove seat 250 and seat adapter 100 altogether.

Figure 21:
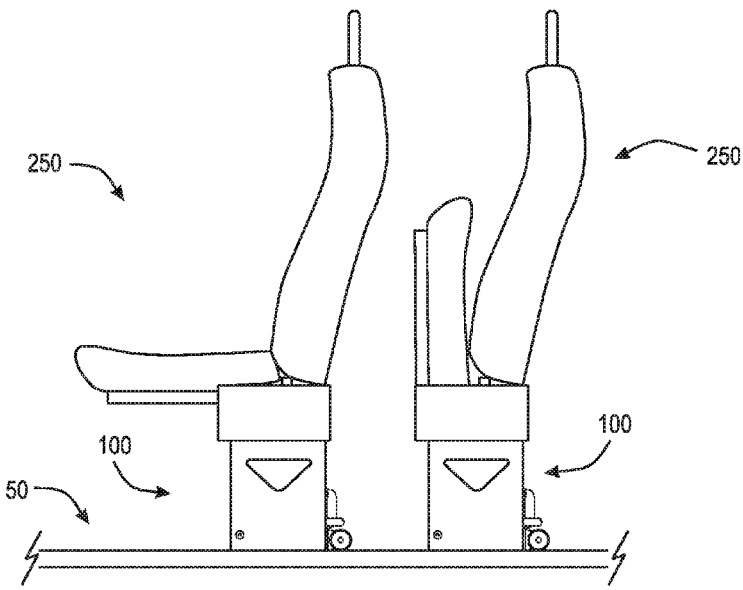
FIG. 21 is a view of a seat adapter of the invention in storage mode and a seat adapter of the invention in use; and,
FIG. 22 is a view of a wheelchair secured to the track of the invention.
Figure 22:
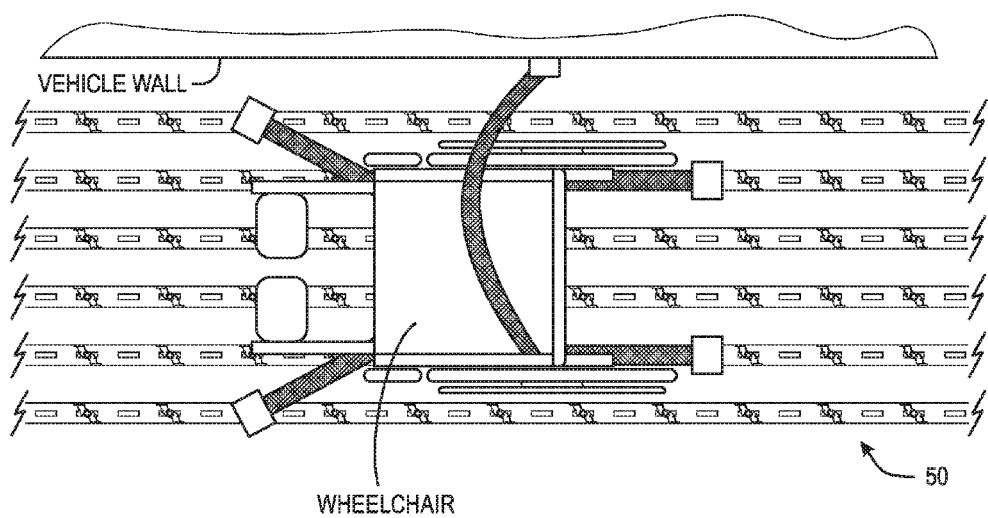

As shown in FIG. 21, seat adapter 100 can be arranged in a storage mode such that a number of seats 250 and seat adapters 100 can be arranged closely together along track system 50. When a number of seat adapters 100 are arranged in this manner, seats 250 are not operational because there is insufficient space to flip down the seat portion of seat 250. However, it is beneficial to be able to store seats 250 and seat adapters 100 so that when seats 250 are needed at a later time, seats 250 are easily accessible and easily positionable as described herein. FIG. 21 also shows seat adapter 100 arranged for use. As long as nothing causing an obstruction in front of seat adapter 100, such as another seat adapter, seat adapter 100 is operational provided it is safely secured in track system 50.

Wheelchairs can be secured to track system 50 using typical industry tie-downs as follows. At least six frames as described herein are arranged in parallel along a floor. Two front belts are secured to tracks of track system 50 which are situated wider than the front of the wheelchair. These belts stabilize the wheelchair side-to-side. Additionally, two rear belts are secured to tracks of track system 50; the rear belts should align with the frame of the wheelchair. A lap and shoulder belt is then typically connected to the rear tie downs, the wall, and the user.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

REFERENCE NUMERALS 10 track
20 frame
20A frame 21 top
22 side
23 side
X longitudinal axis
25 aperture
Z distance
A center point
26 pair of transverse sides
27 pair of longitudinal sides
28 pair of transverse sides
29 pair of longitudinal sides
30 channel
31 lip
32 lip
33 support surface
34 support surface
35 plurality of straight portions
36 plurality of arcuate portions
α angle
40 reinforcement
40A base
40B flange
40C opening
41 exterior surface
42 side surface
50 X-track system
100 seat adapter
100A housing
100B locking system
101 bottom
102 left side
103 right side
104 top of left side
105 top of right side
106 front of left side
107 rear of left side
108 front of right side
109 rear of right side
W wheel
W wheel
110 hook
111 hook
112 cam
112A aperture
113 cam
113A aperture
114 lever
114A lever end
115 lever
115A lever end
116 rung
118 slot
119 slot
120 lock
121 lock
122 angled side
123 angled side
124 lock bolt
125 lock bolt
126 shoulder
127 shoulder
130 extension member
130A L-shaped member
131 extension member
131A L-shaped member
132 appendage
133 appendage
140 pivot
200 user
250 seat

What is claimed is:

1. A rail for positioning and removably securing wheelchairs and transit seats in a vehicle, comprising:
a frame, said frame comprising a top surface, a first side surface, a second side surface, and a longitudinal axis;
a plurality of apertures having a shape, said apertures evenly distributed within said top surface along said longitudinal axis of said frame; and,
a plurality of channels connecting said first and second side surfaces proximate said top surface, said channels evenly distributed along said longitudinal axis of said frame, each said channel comprising a first lip having alternating straight and arcuate portions and a second lip, opposite the first lip, wherein said second lip comprises respective alternating straight and arcuate portions which are aligned with the alternating straight and arcuate portions of said first lip.

2. The rail recited in claim 1, wherein said shape is an elongated quadrilateral.

3. The rail recited in claim 1, wherein said shape is a rectangle.

4. The rail recited in claim 1, wherein said plurality of channels is arranged at an angle relative to said apertures.

5. The rail recited in claim 4, wherein said angle is approximately 45 degrees.

6. The rail recited in claim 1, wherein said plurality of apertures and said plurality of channels are alternately arranged.

7. The rail recited in claim 1, wherein at least one aperture of said plurality of apertures overlaps at least one channel of said plurality of channels.

8. The rail recited in claim 1, wherein said frame further comprises a reinforcement means.

9. An assembly for positioning and removably securing wheelchairs and transit seats in a vehicle, comprising:
a first rail and a second rail each comprising:
a frame, said frame comprising a top surface, a first side surface, a second side surface, and a longitudinal axis;
a plurality of apertures having a shape, said apertures evenly distributed within said top surface along said longitudinal axis of said frame; and,
a plurality of channels connecting said first and second side surfaces proximate said top surface, said channels evenly distributed along said longitudinal axis of said frame, each said channel comprising a first lip having alternating straight and arcuate portions and a second lip, opposite the first lip, wherein said second lip comprises respective alternating straight and arcuate portions which are aligned with the alternating straight and arcuate portions of said first lip; and,
wherein the second rail is arranged parallel to said first rail.

10. The rail recited in claim 9, wherein at least one aperture of said plurality of apertures overlaps at least one channel of said plurality of channels.

11. A rail for positioning and removably securing wheelchairs and transit seats in a vehicle, comprising:
a frame, said frame comprising a top surface, a first side surface, a second side surface, and a longitudinal axis;
a plurality of apertures having a shape, said apertures evenly distributed within said top surface along said longitudinal axis of said frame; and, a plurality of channels connecting said first and second side surfaces proximate said top surface, said channels evenly distributed along said longitudinal axis of said frame, wherein each said channel is arranged at an angle relative to each said aperture and the angle is approximately 45 degrees.

\* \* \* \* \*